(No Model.)
G. L. KITSON.
DEVICE FOR TRANSMITTING POWER.
No. 305,931. Patented Sept. 30, 1884.
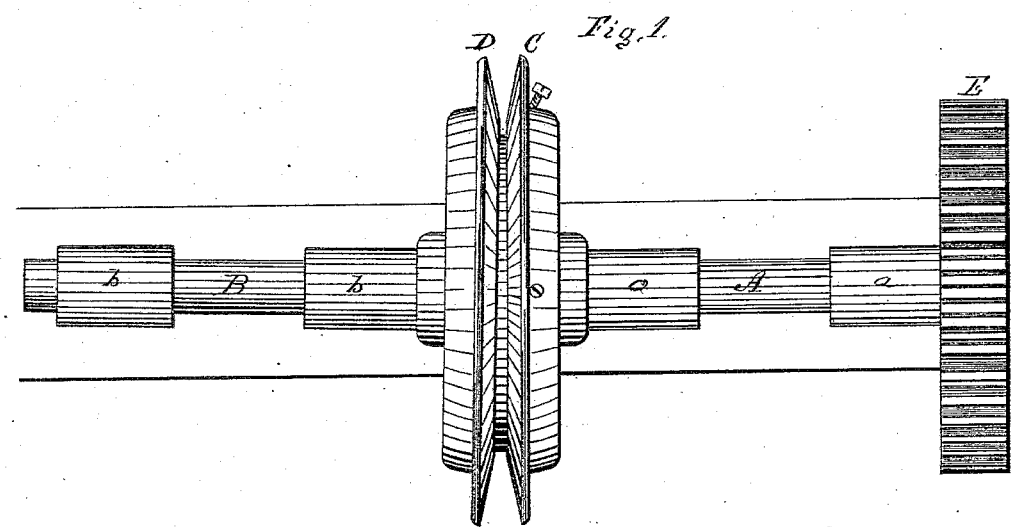
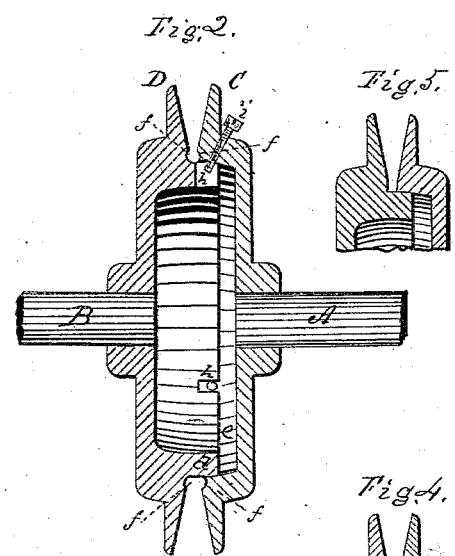
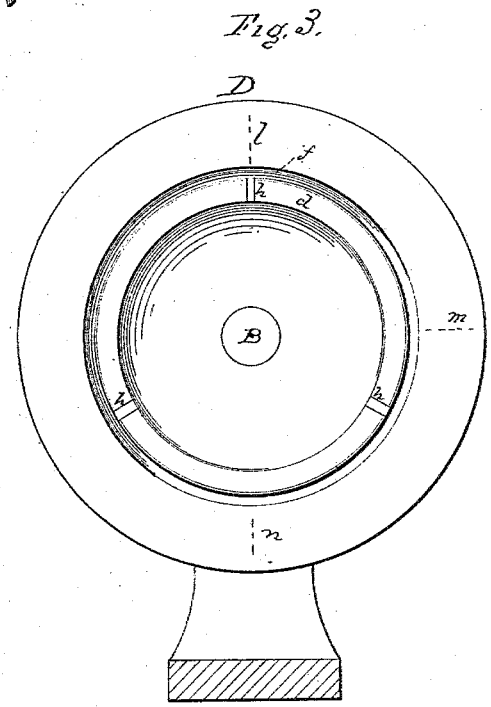
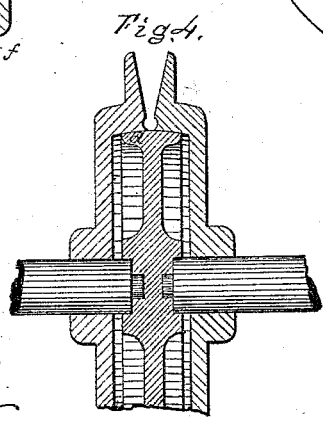
Witnesses:
Lillian D. Kelsey
L. E. Trocher
George L. Kitson
Inventor.
By Atty,

UNITED STATES PATENT OFFICE.

GEORGE L. KITSON, OF WATERBURY, CONN., ASSIGNOR TO THE BENEDICT & BURNHAM MANUFACTURING COMPANY, OF SAME PLACE.

DEVICE FOR TRANSMITTING POWER.

SPECIFICATION forming part of Letters Patent No. 305,931, dated September 30, 1884.

Application filed August 9, 1884. (No model.)

*To all whom it may concern:*

Be it known that I, GEORGE L. KITSON, of Waterbury, in the county of New Haven and State of Connecticut, have invented a new Improvement in Mechanical Devices for Transmitting Power; and I do hereby declare the following, when taken in connection with accompanying drawings and the letters of reference marked thereon, to be a full, clear, and exact description of the same, and which said drawings constitute part of this specification, and represent, in—

Figure 1, a top view showing the two disks on their respective shafts; Fig. 2, a horizontal section through the disks; Fig. 3, a face view of the one disk, D, showing the concentric flange $d$ and the concentric groove $f$ on the face of the disk at its junction with the flange; Figs. 4 and 5, modifications.

This invention relates to a device for applying power in the direction of a pull—as upon a cable, endless band, or other device through which or to which power may be transmitted or applied—the object being to produce a revolving device which shall firmly grip the cable, band, or whatever it may be, and so that the said cable, band, or whatever it may be will advance according to the revolution of the device; and the invention consists in a pair of concentric revolving disks arranged upon axes slightly inclined to each other, and so that the adjacent faces of the disks in revolving gradually approach each other from one point toward the diametrically-opposite point, a concentric cylindrical bearing-surface between said disks upon which the thing to be gripped may run, the adjacent faces of the said disks outside said cylindrical surface (because of the inclination of their axes) operating to gradually grip the thing passing over said cylindrical surface, to cause the said thing to partake of the advance of the rotation of the disks, as more fully hereinafter described.

A represents one shaft, and B the other, arranged in suitable bearings, $a\ a$ and $b\ b$, their adjacent ends concentric with each other; but the axis of one slightly inclined to the axis of the other.

On the one shaft, A, is a disk, C, and on the shaft B is a like disk, D, secured to the respective shafts, and so as to partake of the revolution thereof. Between the said disks is a cylindrical surface, $d$. This cylindrical surface is best produced by making a flange upon the face of the one disk, D, and constructing the other disk, C, with a corresponding recess, $e$, into which the cylindrical flange D may extend. Outside the cylindrical surface $d$ the faces of the disks are inclined outward and from each other, so as to produce substantially a V-shaped space between the two disks. In the face of each disk and around the cylindrical surface is a recess, $f$. Because of the inclination of the axes one to the other the adjacent faces of the disks gradually approach each other from one point to the diametrically-opposite point, and as seen in Figs. 1 and 2. At their nearest point of approach the two recesses $ff$ correspond substantially to the transverse section of the thing to be gripped, and, as shown, this is cylindrical, as for gripping a wire or cable. The two disks should be coupled, so that the power imparted to the one will be communicated to the other, and, as here represented, this is done by slots $h$ in the edge of the flange $d$, with corresponding screws or studs, $i$, in the other disk, to enter said slots, and so that power applied to the shaft A will, through said screws and slots, be communicated to the other shaft. As here represented, power is applied through a gear, E, on the shaft A, but may be otherwise applied.

To illustrate a use for this invention, we will suppose it to be to transmit power through an endless rope or cable. The cable is passed between the two disks, and into the recesses $ff$, there standing substantially as it would in a grooved pulley, with this difference, that whereas in a grooved pulley dependence for transmitting power is based entirely upon frictional contact of the endless cable in the groove of the pulley, in this device the faces of the disks are, say, so close together as to impinge upon the cable at the top, say, as at $l$. From that point on to one-fourth its circumference or point $m$, the width between the grooves at the cylindrical surface is gradually diminishing, and the grip upon the cable is therefore increasing from the point $l$ to the point $m$, and this grip will be sufficient to hold the cable and force it to move with the revolving disks. From the point $m$ to the second quarter, $n$, the groove is gradually opening, and will fully release the cable at that point. By the use of this device, therefore, power may be transmitted through a cable, notwithstanding it may be very loose, and by no possibility can it slip from its grip. The power communicated, therefore, is of the most positive character.

In general practice it will be better that at the opposite point to which the power is to be communicated a like gripping device shall be applied to the shaft, and so that the pull of the cable upon that gripping device will force its corresponding revolution.

Another illustration of the use of this device may be as in a hoisting mechanism, in which the rope or cable passes over the cylindrical portion between the disks, and is gripped in like manner to lift a weight suspended thereon, or, with the disks turned in the opposite direction, to lower such weight.

One other illustration of the use of this invention will be sufficient to show its adaptation to various purposes, and that is as a feeding device for wire or cable which is drawn through a machine in which the cable is formed, covered, or otherwise treated, and where power is required to so draw the cable or wire through the machine. In such use the first end of the wire is introduced upon the cylindrical surface, and at the grooves at a point where the grooves will impinge upon the surface and so as to make a grip thereon. Then the end will be taken, with the revolving disks, around to near the opposite point, from whence it will escape, and may be taken therefrom to a reel or to other machines, as the case may be, this device insuring a constant and steady pull upon the wire or cable.

While I prefer to make the cylindrical surface as a part of one of the disks, it may be made detached from either, as seen in Fig. 4, the two disks recessed alike, the flange $d$ extending into both recesses, and fitted therein, and may be coupled with either one or both of the shafts, as shown in Fig. 4.

While I prefer to construct the faces of the disk, at their junction with the cylindrical surface, with the concentric groove, it will be evident that a strong grip may be produced by constructing that surface without the groove, as seen in Fig. 5. I therefore do not wish to be understood as limiting my invention to the groove.

I claim—

1. The combination of a pair of concentric revolving disks arranged upon axes slightly inclined to each other, and so that the adjacent faces of the disks in revolving gradually approach each other from one point toward the diametrically-opposite point, with a concentric bearing-surface between said disks, substantially as described, and whereby the cable or whatever it may be running upon said cylindrical surface will be gradually gripped by said disks, and so as to partake of the revolution of the disks, as described.

2. The combination of a pair of concentric revolving disks arranged upon axes slightly inclined to each other, and so that the adjacent faces of the disks in revolving gradually approach each other from one point toward the diametrically-opposite point, the concentric cylindrical bearing-surface between said disks, the said disks at the said cylindrical bearing-surfaces constructed with a concentric groove, substantially as and for the purpose described.

3. The combination of a pair of concentric revolving disks arranged upon axes slightly inclined to each other, and so that the adjacent faces of the disks in revolving gradually approach each other from one point toward the diametrically-opposite point, the one disk constructed with a concentric flange upon its face, the other disk with a concentric recess corresponding to said concentric flange, and into which said concentric flange will enter, substantially as described.

4. The combination of a pair of concentric revolving disks arranged upon axes slightly inclined to each other, and so that the adjacent faces of the disks in revolving gradually approach each other from one point toward the diametrically-opposite point, one of said disks constructed with a concentric flange upon its face, the other with a correspondingly concentric recess into which the said flange will enter, each of said disks constructed with a concentric groove at the junction of the face with the said concentric flange, substantially as and for the purpose described.

GEORGE L. KITSON.

Witnesses:
JOHN E. EARLE,
LILLIAN D. KELSEY.